United States Patent
Nuppenau et al.

(10) Patent No.: US 7,325,672 B2
(45) Date of Patent: Feb. 5, 2008

(54) DEVICE FOR STOPPING A CONTINUOUS PRODUCT STREAM OF A ROTARY PRESS

(75) Inventors: Detlef Nuppenau, Salem (DE); Harald Romer, Reinbek (DE); Sven Kolbe, Buchen (DE); Frank Schade, Anker (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 11/614,463

(22) Filed: Dec. 21, 2006

(65) Prior Publication Data

US 2007/0144870 A1    Jun. 28, 2007

(30) Foreign Application Priority Data

Dec. 28, 2005  (DE) .................. 10 2005 062 715

(51) Int. Cl.
*B65G 43/00*    (2006.01)
(52) U.S. Cl. .................. 198/778; 198/435; 198/467.1; 198/545
(58) Field of Classification Search ............. 198/418.6, 198/435, 467.1, 468.6, 541, 5, 546, 548, 198/550.6, 778; 209/DIG. 913
See application file for complete search history.

(56) References Cited

U.S. PATENT DOCUMENTS

| | | | |
|---|---|---|---|
| 4,734,149 A * | 3/1988 | Brown ..................... 156/381 |
| 5,214,934 A * | 6/1993 | Palframan et al. ........... 62/381 |
| 5,291,987 A * | 3/1994 | Zink ........................ 198/724 |
| 5,415,280 A * | 5/1995 | Balboni et al. ............. 198/435 |
| 5,447,223 A * | 9/1995 | Dasgupta .................... 198/778 |
| 5,833,045 A * | 11/1998 | Osti et al. ................... 198/444 |
| 5,906,484 A * | 5/1999 | Imai .......................... 432/121 |
| 6,092,641 A * | 7/2000 | Draghetti ................... 198/406 |
| 6,244,168 B1 * | 6/2001 | van de Vorst et al. .... 99/443 C |
| 6,371,275 B1 * | 4/2002 | Terrell et al. ............... 198/367 |
| 6,394,261 B1 * | 5/2002 | DeGennaro ................ 198/815 |
| 6,659,268 B2 * | 12/2003 | Belz et al. .................. 198/778 |
| 6,829,461 B2 * | 12/2004 | Arai et al. .................. 399/253 |

FOREIGN PATENT DOCUMENTS

DE    37 13 509 A1    10/1987
DE    94 06 712 U1    8/1994

* cited by examiner

*Primary Examiner*—Douglas A Hess
(74) *Attorney, Agent, or Firm*—Vidas, Arrett & Steinkraus, P.A.

(57) ABSTRACT

A device for stopping a continuous product stream of the products of a rotary press, with a height conveyor which has a lower loading region to which the products are supplied via a first conveying means, and an upper delivery region, from which the products are conveyed to a reception container via a second conveying means, wherein on the downstream side of the delivery region of the height conveyor a switch is assigned to the second conveying means, a third conveying device being connected to this switch, the lower end of which is assigned to the loading region of the height conveyor, so that the products are supplied to the second or third conveying means depending on the condition of the switch

5 Claims, 1 Drawing Sheet

DEVICE FOR STOPPING A CONTINUOUS PRODUCT STREAM OF A ROTARY PRESS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The products made in a rotary press, tablets for instance, are stripped off from the upper side of a die plate with the aid of a strip-off device and mostly reach a reception container or optionally even a testing station via a gravity chute. Frequently, the products are at first de-dusted before they are packaged. This takes place in a so-called deduster.

Products of a rotary press which contains toxic materials must be handled such that operators which are present in the production room are not endangered. Therefore it is already known to seal up the press room of the rotary press and to negatively pressurize it, in order not to permit dusts to escape from the press room to the outside. The products are shielded, lead out of the press room and then they mostly reach an isolator, i e. a sealed room, in which further processes take place, de-dusting for instance, or even tests with respect to the desired parameters of the products. Next, the products are directed from the isolator into a product container.

In order to avoid uncontrolled escape of production material and dusts from dust-tight claddings, the inward and outward transfer of production material takes place via openings which are equipped with security flaps. In order to be able to securely open and close the security flaps when docking in and docking out a product container, for instance, and no processed product being damaged also, the region of the flaps has to be kept free of product material during the switching operation. Up to now, this takes place by stopping the rotary press Initiation of the stopping procedure leads to breakdown of the otherwise continuous process and to the production of rejections when the press is started again For reasons of room-saving conveying means it is also known to assign a height conveyor to the rotary press, which has a lower loading region and an upper delivery region. The loading region is immediately connected with the run out of the rotary press. The delivery region is connected with the product container via a suitable conveying means. In the line to the product container, there is a flap or valve, which is closed during the removal of the product container or when it is replaced by another one. If it is desired that the production continues, there is the danger that operation breakdown or leakages of the security flap may take place or that tablets are damaged by closing the flap.

The present invention is based on the objective to provide a device for filling reception containers or stopping the product stream of a rotary press, which permits an uninterrupted operation of the rotary press even when the reception container is changed.

BRIEF SUMMARY OF THE INVENTION

In the device according to the present invention, a switch is assigned to the second conveying means on the downstream side of the delivery region of the height conveyor, a third conveying device being assigned to the switch, the lower end of which is assigned to the loading region of the height conveyor, so that the products are supplied to the second or third conveying means depending on the condition of the switch.

For instance, the height conveyor is a vertical conveying path excited to vibration If the switch is set such that the delivery region of the height conveyor is connected with the loading region, the products are conveyed in a circle, and the height conveyor forms a buffer which provides continuous operation of the rotary press. It will be appreciated that not as many products can be fed into the buffet path as is just liked. However, it is sufficiently receptive to bridge the time which is required for the replacement of a filled reception container with an empty one Preferably, the conveying means are linear, for instance pipes like a gravity chute or the like. According to a further embodiment of the present invention, the height conveyor can be arranged in a closed or sealed-up, respectively, room of an isolator.

Finally, it is also possible to assign an open vessel to the third conveying means, into which the products are input before supplying them to the loading region of the height conveyor. From this vessel, products may be taken away, for testing purposes for instance. They may be also inspected in order to check them for their quality.

One example of the realization of the present invention will be explained in more detail by means of a drawing.

DETAILED DESCRIPTION OF THE INVENTION

Figure 1:
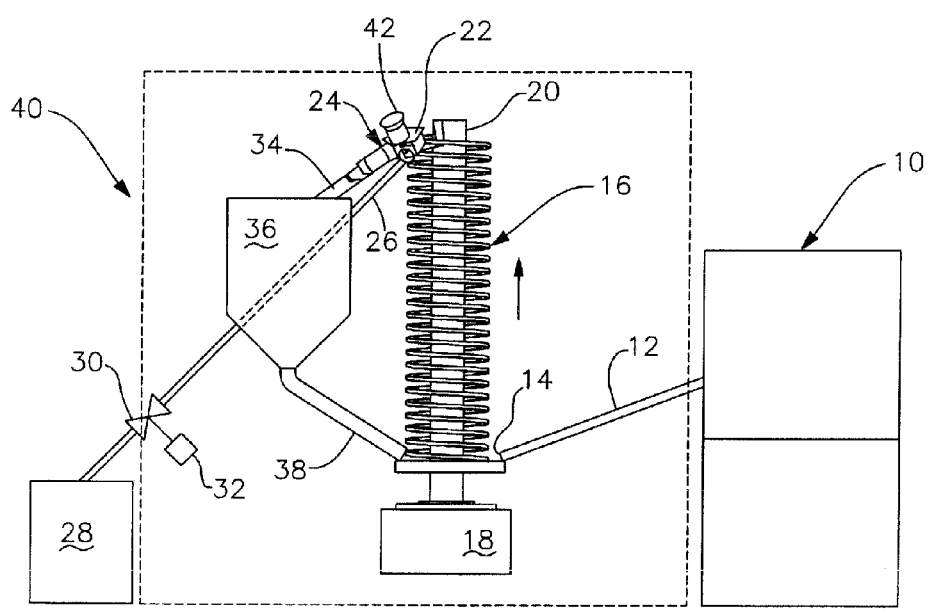
FIG. 1 shows a schematically a device according to the invention.

While this invention may be embodied in many different forms, there are described in detail herein a specific preferred embodiment of the invention. This description is an exemplification of the principles of the invention and is not intended to limit the invention to the particular embodiment illustrated In FIG. 1, a rotary press 10 is represented in a general way, which has a sealed press room, for instance, which is negatively pressurized by suitable means, for instance. This is not shown, however. The manufactured products, tablets for instance, reach via a falling gravity chute 12 a loading region 14 of a vertically disposed conveying path 16, which is at the same time set into vibrations with the aid of a vibration device 18. The tablets reach the upside into a delivery region 20. From there, they reach a pipe portion 22, which is followed by a switch 24. A first pipe-shaped gravity chute 26 is connected with the switch, which leads to a product container 28. In the gravity chute 26, there is a closing flap 30. Product container 28 and rotary press 10 stand on a common base floor. A second line 34 leads into a vessel 36. The lower end of the vessel is also connected with the loading region 14 of the conveying path 16 via a line 38.

Conveying path 16, vessel 36 and the greatest part of the lines 26, 34 and 38 are situated in the sealed room of a so-called isolator 40. In this sealed room, de-dusting means may also be provided, which are not shown here, however.

During normal operation, the products from the rotary press 10 reach the product container via the conveying path 16 and the line 26. When this container is filled and is to be replaced by an empty one, the switch 24 is reversed by a not shown actuating installation 42, and the products come via the gravity chute 34 into the vessel 36 and from this via the gravity chute 38 to the loading region 14. In this way, the products are conveyed in a circle, and this circle forms a buffer for continuously produced products, which are continuously supplied to the loading region 14 via the gravity chute 12. In the meantime, the valve 30 is also closed. After an empty container instead of the full container 28 has been set on, the valve 30 is opened again and the switch is set back into the opening condition, so that now the fresh product container can be filled with the products.

The above disclosure is intended to be illustrative and not exhaustive This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A device for stopping a continuous product stream of products of a rotary press, with a height conveyor which has a lower loading region to which the products are supplied via a first conveying means, and an upper delivery region, from which the products are conveyed to a reception container via a second conveying means, characterised in that on the downstream side of the delivery region (20) of the height conveyor (16) a switch (24) is assigned to the second conveying means, a third conveying device being connected to the switch (24), the lower end of which is assigned to the loading region (14) of the height conveyor (16), so that the products are supplied to the second or third conveying means depending on the condition of the switch (24).

2. Device according to claim 1, characterised in that the first and/or the second conveying means convey linearly.

3. Device according to claim 1, characterised in that the height conveyor (16) and the switch (24) are arranged in a closed or sealed up room, respectively, of an isolator (40).

4. Device according to claim 1, characterised in that an open vessel (36) is disposed in a course of the third conveying means, via which the products are lead to the loading region of the height conveyor (16).

5. A device comprising:
   a rotary press (10), which produces a continuous stream of products;
   a height conveyor (16) having a lower loading region (14) and an upper delivery region (20), for conveying the products from the lower loading region (14) to the upper delivery region;
   a first conveyor (12) which is connected to the rotary press (10), for conveying the products from the rotary press to a lower loading region (14) of the height conveyor (16);
   a switch (24), connected to the upper delivery region of the height conveyor, which is also connected either to a second conveyor or a third conveyor, depending on a state of the switch, the second conveyor, when connected to the switch, conveying products to a receipt container (28), and the third conveyor, when connected to the switch, conveying products to the loading region (14) of the height conveyor (16).

* * * * *